United States Patent [19]

Lin et al.

[11] Patent Number: 4,552,820
[45] Date of Patent: Nov. 12, 1985

[54] DISC MEDIA

[75] Inventors: Yeong S. Lin, Monte Sereno; Nathan T. Ballard; John T. Lee, both of San Jose; Edward F. Teng, Sunnyvale, all of Calif.

[73] Assignee: Lin Data Corporation, Santa Clara, Calif.

[21] Appl. No.: 603,534

[22] Filed: Apr. 25, 1984

[51] Int. Cl.$^4$ .......................... G11B 5/66; G11B 5/82; C23C 15/00

[52] U.S. Cl. .................................... 428/611; 428/652; 428/667; 428/680; 428/928; 360/135; 204/192 M

[58] Field of Search ............... 428/611, 928, 678, 679, 428/687, 652, 680, 629, 634, 667; 360/134, 135; 204/192 M

[56] References Cited

U.S. PATENT DOCUMENTS

| 3,466,156 | 9/1969 | Peters et al. | 428/678 |
|---|---|---|---|
| 4,079,169 | 3/1978 | Nigh et al. | 360/134 |
| 4,245,008 | 1/1981 | Michaelsen et al. | 428/678 |
| 4,307,156 | 12/1981 | Yanagisawa | 360/135 |
| 4,411,963 | 10/1983 | Aine | 428/928 |
| 4,426,265 | 1/1984 | Brunsch et al. | 204/192 M |
| 4,444,848 | 4/1984 | Shanefield et al. | 428/675 |

FOREIGN PATENT DOCUMENTS

| 2547408 | 4/1976 | Fed. Rep. of Germany | 360/135 |
|---|---|---|---|
| 164033 | 9/1983 | Japan | 360/135 |

OTHER PUBLICATIONS

"R.F. Sputtered Co-Cr Layers for Perpendicular Magnetic Recording", Lodder et al., Thin Solid Films, 101 (1983) 61-73.
"Nitrogen-Induced FCC Phase in Rf Sputtered Co-Cr Films . . . ", Coughlin, T. M., J. Vac. Sci. Technol., 20(2), Feb. 1982.
"RF-Sputtered Chromium-Cobalt Films for High-Density Longitudinal Magnetic Recording", W. T. Maloney, IEEE Transactions on Magnetics, vol. Mag.-15, No. 6, Nov. 1979, pp. 1546-1548.
"Effect of Ion Bombardment During Deposition on Magnetic Film Properties, L. F. Herte, A. Long, Jr., Journal of Vacuum Science Technology 18(2), Mar. 1981, pp. 153-155.
"The Optimization of Sputtered Co-Cr Layered Medium for Maximum Areal Density", W. T. Maloney, IEEE Transactions on Magnetics, vol. Mag.-17, No. 6, Nov. 1981, pp. 3196-3197.
"Trends in Metallization Materials", Ron Iscoff, Semiconductor International, Oct. 1982, pp. 57-65.

Primary Examiner—L. Dewayne Rutledge
Assistant Examiner—John J. Zimmerman
Attorney, Agent, or Firm—Townsend and Townsend

[57] ABSTRACT

A thin-film disc fabrication method and structure contemplates a sputtered undercoat. An aluminum base is subjected to a fine polishing step, and a relatively thin undercoat is deposited by sputtering. The preferred undercoat is a 0.3-3 micron layer of nickel-vanadium alloy (on the order of 7% vanadium). The preferred recording layer is a sputtered composite structure comprising a layer of chromium and an overlying layer of a cobalt-chromium alloy. Modulation effects can be substantially eliminated by heating the aluminum base prior to sputtering the nickel-vanadium undercoat, and by oxidizing the undercoat prior to deposition of the overlying layers.

20 Claims, 3 Drawing Figures

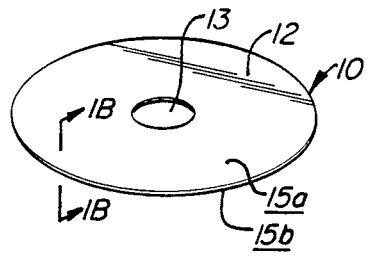
FIG._1A.
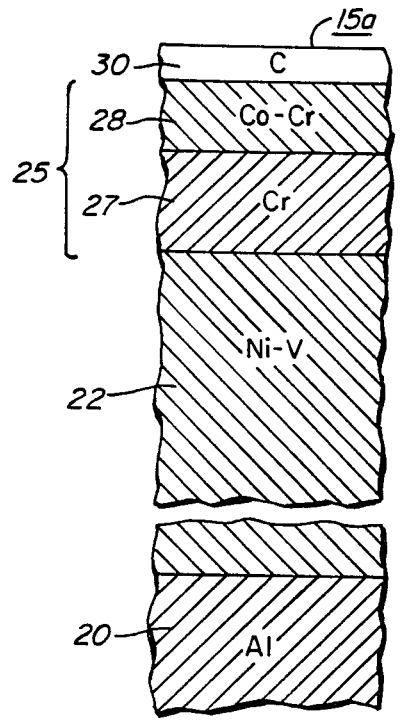
FIG._1B.
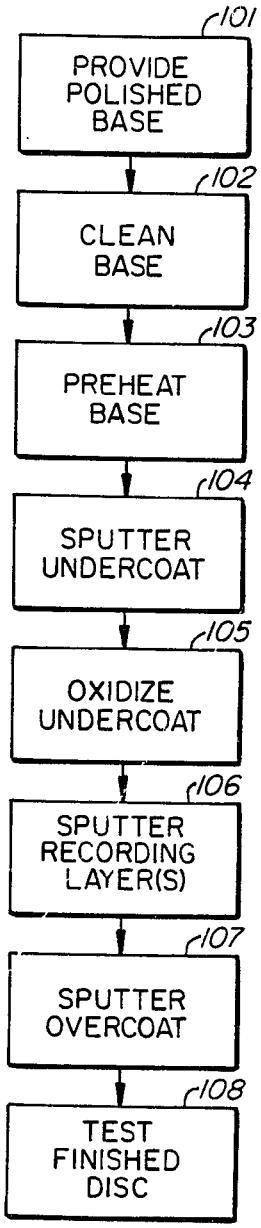
FIG._2.

DISC MEDIA

FIELD OF THE INVENTION

The invention relates generally to magnetic discs, and more specifically to an improved substrate for a thin-film disc.

BACKGROUND OF THE INVENTION

Significant increases in the storage densities of magnetic disc media have resulted from improvements in recording techniques and improvements in the magnetic media. Regarding the latter, the most significant recent improvement has been the so-called thin-film disc where one or more plated (or sometimes sputtered) metallic layers replace the spin-coated particulate (iron oxide) layer used in earlier discs. The metallic layers often define a composite structure including a non-magnetic (for example chromium) layer and a magnetic (for example cobalt) layer. Such thin-film media are more durable, have better signal-to-noise ratios, and should ultimately prove to be cheaper than the particulate media.

Regardless of the particular coating technology, a suitable substrate is required to receive the subsequent layers. In the fabrication of commercial thin-film discs, aluminum is nearly universal. A layer of non-magnetic nickel alloy (such as nickel-phosphorus) is deposited on a polished aluminum base by an electroless plating process to a thickness on the order of 8-20 microns. The nickel alloy surface is then polished flat (say to a roughness less than 250A or 1 microinch) using a very fine abrasive to provide a finished layer having a thickness on the order of 5-15 microns. The plated and polished structure provides the finished substrate which is then subjected to further plating or sputtering steps to deposit the magnetic layer. A wear-resistant overcoat is normally deposited over the magnetic layer. In view of its position within the finished disc, the nickel alloy layer is referred to as the undercoat.

There is, of course, no requirement that the substrate fabrication and the magnetic coating be done in the same facility or by the same entity. Indeed, it is more typical for the substrates to be fabricated by one manufacturer and supplied to another for magnetic coating and testing.

SUMMARY OF THE INVENTION

The present invention provides a thin-film disc fabrication method and structure that result in better quality and lower cost than previous techniques.

Broadly, the present invention contemplates a sputtered undercoat. More particularly, an aluminum base is subjected to a fine polishing step, and a relatively thin undercoat is deposited by sputtering. This provides a finished substrate which may be subjected to further coating steps to provide the final disc.

The use of a sputtering technique for depositing the undercoat makes it possible to perform the entire coating sequence in-line where the other layers are also sputtered. That is, once the highly polished aluminum base is obtained, the undercoat, magnetic layer, and the overcoat may be deposited in subsequent sputtering operations on a single fabrication line. This allows vertical integration of the manufacturing process with its attendant economies. Moreover, quality control may be maintained more easily since the sputtered substrate does not leave the carefully controlled conditions of the fabrication line prior to receiving the magnetic layer.

Sputtering the undercoat provides other advantages over a comparable plating step. Plating, being a wet process, presents serious problems in temperature control, maintaining constant solution density, impurity entrapment, and chemical waste treatment. Sputtering, on the other hand, is a relatively clean process whose parameters may be easily controlled. As a consequence, the sputtering step results in a relatively thin layer having uniform desired composition and thickness. This allows relatively high throughput and eliminates the need for a separate polishing step which would have to be performed off-line. While the use of a thin sputtered layer does require a somewhat higher polish on the aluminum base, the cost of such is relatively minor.

The preferred undercoat is a 0.3-3 micron layer of nickel-vanadium alloy (on the order of 7% vanadium). Compared to the commonly used materials such as plated nickel-phosphorus, the sputtered nickel-vanadium undercoat is considerably less susceptible to corrosion and admits to tighter composition control. It has also been found that the nickel-vanadium leads to a higher coercivity of the magnetic layer than does a nickel-phosphorus undercoat.

The preferred recording layer is a sputtered composite structure comprising a layer of chromium and an overlying layer of a cobalt-chromium alloy (on the order of 80-90% cobalt). The chromium layer is generally about 500-3000A thick while the cobalt-chromium layer is generally about 500-2000A thick. The preferred overcoat is a carbon layer generally about 200-1000A thick.

The properties of the recording layer have been found to be improved by performing certain additional processing steps. For example, it has been found that modulation effects (variations of signal strength) can be substantially eliminated by heating the aluminum base prior to sputtering the nickel-vanadium undercoat, and by oxidizing the undercoat prior to deposition of the overlying layers.

A further understanding of the nature and advantages of the present invention may be realized by reference to the remaining portions of the specification and drawings.

BRIEF DESCRIPTION OF THE DRAWINGS

FIG. 1A is a perspective view of a thin-film disc manufactured according to the present invention;

FIG. 1B is a fragmentary cross-sectional view of the disc taken along lines 1B—1B of FIG. 1A; and FIG. 2 is a block diagram of a fabrication method for making the disc of FIGS. 1A-B.

DETAILED DESCRIPTION OF THE INVENTION

FIG. 1A is a perspective view of a thin-film disc 10 as contemplated by the present invention. Disc 10, as is well-known, is a rigid annular element 12 formed with a central aperture 13 and having upper and lower surfaces 15a and 15b which carry magnetic recording layers thereon. While the overall disc dimensions do not form a particular part of the present invention, it is noted in passing that one standard sized disc has a 5.25-inch outer diameter, a 40-mm aperture diameter, and a 75-mil thickness. In use, disc 10 is incorporated into a disc drive such as a Winchester drive.

FIG. 1B is a fragmentary cross-sectional view, taken along line 1B—1B of FIG. 1A, showing the composition and arrangement of the layers that make up disc 10. For definiteness, the region in the vicinity of upper surface 15a is shown; the region in the vicinity of lower surface 15b is the mirror image. In broad terms, disc 10 is made up of a number of thin layers that are successively deposited on a polished aluminum base. In the representative embodiment there are four such layers, the total thickness of which is about 1–3 microns (generally only about one-thousandth the total disc thickness).

Disc 10 comprises a base 20 on which are deposited, in the following order, an undercoat 22, a composite recording layer 25 having layers 27 and 28, and an overcoat 30. The significance and particulars of these layers will now be described.

The purpose of base 20 is to provide rigidity and mechanical stability for composite recording layer 25. Base 20 is preferably aluminum and represents a commercial article as might be purchased from KSI Disc Products, Chino, Calif. Since the layers that are deposited on base 20 are relatively thin, it is important that the surface of the base be highly polished, preferably so the roughness is less than about 1 microinch (approximately 250 angstroms).

The purpose of undercoat 22 is to provide hardness and smoothness, and to enhance the adhesion of the recording layer. Thus, undercoat 22 must be formed of a non-magnetic material having high tensile strength. The preferred undercoat material is a nickel-vanadium alloy (7% vanadium). The thickness should be less than about 10 microns in order that the deposition (to be described below) not be unduly prolonged. A suitable thickness range is 0.3–3 microns, with about 0.5–1.5 being preferred.

Composite recording layer 25 is the operative portion of disc 10, since it is within this portion that digital data in the form of alternately magnetized regions are stored. To this end, at least one of the layers must be formed of magnetizable material. For horizontal recording, the easy axis of magnetization should be in the plane of the disc. Layer 27 is preferably a 0.05–0.3-micron (500–3000A) layer of (non-magnetic) chromium while layer 28 is preferably a 0.05–0.2-micron (500–2000A) layer of (magnetic) cobalt-chromium alloy (10–20% chromium). Instead of cobalt-chromium, cobalt-nickel (15–30% nickel) or cobalt-rhenium (10–30% rhenium) can be used.

The purpose of overcoat 30 is to provide a very hard wear-resistant coating to protect magnetic layer 28. To this end, overcoat 30 may be formed of carbon having a thickness of 0.02–0.1 microns (200–1000A).

FIG. 2 is a block diagram illustrating the sequence of steps used to fabricate disc 10 with a structure as described above. First, as alluded to above, a suitably polished aluminum base is provided (101). The base must be polished so that its roughness is less than approximately 250 angstroms. The base may be obtained polished to this degree from the vendor or the final polishing may be carried out as a separate step. In either case, the polished base is then cleaned (102), preferably by subjecting it to a solvent and detergent bath to remove any dust or other contaminants from the surfaces. This may be carried out in a commercial disc cleaner of the type sold by Ultratech, San Carlos, Calif.

Generally, the various layers are deposited in a vacuum deposition step, namely sputtering. The sputtering is carried out in a multi-station sputtering machine such as that manufactured by Circuits Processing Apparatus, Inc., Fremont, Calif. The discs are carried in suitable carriers on a conveyor system that carries them past opposed pairs of targets so that both sides may be coated simultaneously. The particular sputtering machine configuration is selected on the basis of the overall process needs. The considerations include desired throughput and the number and type of layers to be sputtered.

The targets are specified by composition and size, and may be purchased from Materials Research Corporation, Orangeburg, N.Y. A representative target size is 14.875"×4.75". Suitable target thicknesses are:

| | |
|---|---|
| Nickel-vanadium | 0.375" |
| Chromium | 0.25" |
| Cobalt-Chromium | 0.10" |
| Carbon | 0.25" |

For production purposes, a cobalt-chromium alloy target is preferred for sputtering layer 28. However, during the development phase, cobalt-chromium layer 28 was sputtered with closely positioned cobalt and chromium targets aligned in a V-configuration.

For reasons to be discussed below, the base is radiatively preheated (103) prior to its passing by the sputtering targets. The preheating is provided by one or more electrical heaters within the vacuum chamber. Since the heating is in vacuum, the disc remains at the desired elevated temperature during the subsequent deposition.

The preheated base is passed by nickel-vanadium alloy targets whereupon undercoat 22 is deposited (104). As with the subsequent sputtering steps, the target size and power must be correlated with the conveyor speed to achieve the desired thickness of the sputtered layer. Other considerations might impose further constraints. For example, as will be discussed below, it may be advantageous to limit the rate of deposition of the nickel-vanadium undercoat. In such a case, the base may be subjected to a prolonged undercoating step which may be provided by multiple target stations.

Prior to deposition of the additional layers, the nickel-vanadium layer is oxidized (105). For test purposes the oxidation was carried out by removing the nickel-vanadium coated base from the sputtering machine, exposing it to ambient air for a desired length of time, and then re-introducing it into the sputtering machine for subsequent steps. Clearly, such removal and reintroduction represent a substantial interruption and would have an adverse effect on the process throughput. Thus, where oxidation is to be carried out during production, it is desirable to provide a separate chamber in the sputtering line where the discs would be exposed to oxygen.

The nickel-vanadium coated base may be viewed as the finished substrate onto which the composite recording layer is deposited (106). As discussed above, the recording medium is actually deposited as a two-layer composite 25 which includes chromium layer 27 and cobalt-chromium layer 28. Carbon overcoat 30 is then deposited (107) to complete the fabrication cycle.

The finished disc is then subjected to appropriate testing (108) after which the disc can be considered ready for incorporation into a disc drive. As discussed above, the relevant properties of disc 10 are the properties of magnetic layer 28. However, as will be seen below the other layers are relevant in that their properties may be altered so as to bring about desired changes in the properties of the magnetic layer.

An important characteristic of the finished disc is the uniformity of the recording layer over the surface. In particular, when a track is written on the disc the degree of magnetization should not vary with azimuthal coordinate. Put another way, for horizontal recording, the easy axis of magnetization should lie in the plane of he disc, but should not have any preferred orientation in the plane.

The uniformity of the recording characteristics may be measured by writing successive alternating 1's and 0's (alternating magnetization) around the entire track, reading the disc, and sensing the amplitude of the voltage signal. The voltage output is proportional to the time rate of change of flux, and for a constant rate of rotation, the amplitude provides a measure of the magnetization strength. Any systematic anisotropy in the recording layer manifests itself in a signal whose strength varies with azimuthal position. If modulation is defined as the ratio of the signal amplitude at its maximum to the signal amplitude at its minimum, the degree to which the modulation exceeds 1 is a measure of the anisotropy.

It has been discovered that the sputtering process tends to produce an anisotropic layer that is characterized by a significant modulation factor (as high as 1.37 assuming no steps are taken to lower it). The anisotropy has been found to be correlated with the geometry of the sputtering machine. In particular, the easy axis of magnetization has been found to be preferentially aligned with the direction of motion through the machine, which coincides with the field direction of the magnets associated with the sputtering targets.

However, it has been determined that the modulation can be reduced to very nearly 1.0 by suitable manipulation of one or more of the processing parameters. Tables 1-5 show test results for respective sequences of runs where all process parameters were maintained constant except for a particular one being manipulated. Thus each table shows the dependence of modulation on a particular process parameter. The modulation values are tabulated in the rightmost column, under the heading "Mod".

The main process parameters for a given run are the disc speeds at different points in the process, the sputtering target powers, and the preheater currents. Speeds are given in centimeters per minute, target powers in kilowatts, and heater currents in amperes. It is to be understood that the particular parameter values are appropriate for the process as implemented on a particular sputtering machine and configuration; the appropriate parameters for different machines or configurations would have to be determined by straightforward experimentation. However, the relative values and functional relationships to be discussed tend to be of general applicability.

Table 1 shows the effect of oxidizing nickel-vanadium undercoat 22 prior to depositing the other layers. For two samples with no oxidation of the undercoat, the modulation was found to be 1.35 or above. A five-minute exposure to ambient reduced the modulation to 1.10 (which is acceptable for most purposes); a larger oxidation time (overnight) was required to reduce the modulation to under 1.05. It is believed that the oxidation of undercoat 22 reduces the modulation by causing the grain size of the subsequently deposited chromium layer 27 to be increased which then renders the deposition of cobalt-chromium layer 28 more isotropic than it would otherwise be.

Table 2 shows the effect of preheating base 20 prior to depositing nickel-vanadium undercoat 22. As can be seen, perceptible reductions in modulation can be achieved by heating the disc above about 200° C. although heating to a higher temperature (say above about 250° C.) provides a more dramatic reduction. It is noted that the heater used in the tests was not sufficiently powerful to provide the higher temperatures in a single pass, and multiple passes were required. It is believed that the preheating of the aluminum base causes the nickel-vanadium grain size to be increased, which tends to increase the grain size of the other layers so that the ultimate deposition of the cobalt-chromium layer is more isotropic.

Table 3 shows the effect of undercoat power on modulation. As can be seen, sputtering the undercoat at low power can produce a disc having a modulation below about 1.05. However, the deposition rate is generally proportional to power, so that a lower power is accompanied by a lower throughput. Such a sacrifice in throughput may be obviated by providing a series of nickel-vanadium target stations, each run at lower power. It is believed that the deposition of the nickel-vanadium layer too quickly causes internal stresses which result in anisotropy of the magnetic layer.

Table 4 shows the effect of preheating immediately prior to the deposition of the chromium layer. It can be seen that preheating at this point actually increases the modulation. However, these data do not rule out the possibility that some degree of preheating may be desirable.

Table 5 shows the effect of the chromium target power on modulation. The improvements realized are along the lines of those realized by reducing the undercoat target power.

Table 6 compares the coercivity ($H_c$) and remanent moment ($M_r$) for different undercoats, and illustrates an unexpected benefit of using nickel-vanadium rather than nickel-phosphorus. In comparing discs having a sputtered nickel-vanadium undercoat with those having a plated nickel-phosphorus undercoat, it has been found that the former have a significantly higher coercivity ($H_c$). A higher coercivity allows higher recording densities to be achieved.

A review of the test results discussed above shows that several different sets of process parameters may be used to produce discs characterized by acceptably low modulation. Two sets of parameters that appear best overall are those for disc #B-38 in Table 1 and disc #B-46 in Table 3, and may be considered representative of the preferred parameters. The former set specifies oxidation, which in the tests entailed removal of the disc from the sputtering machine. The second set specifies slow deposition, which in the tests entailed multiple passes. Both represent inconveniences, but as described above, the preferred apparatus eliminates such inconveniences. Thus, in the preferred apparatus, the oxidation is effected in-line and the slow deposition is achieved with multiple targets arranged serially.

In summary, it can be seen that the present invention provides a clean and highly-versatile process which allows high-quality discs to be fabricated reproducibly. While the above provides a complete description of the invention, it will be appreciated that alternate constructions, modifications, and equivalents may be employed without departing from the spirit and scope of the invention. For example, the layer thicknesses shown were for illustrative purposes only, and could be varied within appropriate ranges while still retaining the benefits of the present invention. Additionally, while a (chromium)/(cobalt-chromium) composite recording structure is the preferred embodiment, a wide variety of recording structures are known, and could be utilized. These would include single-layer as well as double-layer structures. Therefore, the scope of the invention is not limited by the above description and illustration, but is defined by the appended claims.

TABLE 1

Ni—V Oxidation Effect

| Disk # | Oxidation Time | Preheat Amp | Preheat Speed | Ni—V kw | Ni—V Speed | Preheat Amp | Preheat Speed | Cr kw | Cr Speed | Co/Cr kw/kw | Mod. |
|---|---|---|---|---|---|---|---|---|---|---|---|
| B-33 | none | 6 | 10 | 4 | 5 | 7 | 10 | .75 | 10 | .502/.091 | 1.35 |
| B-43 | 5 min | 6 | 10 | 4 | 5 | 7 | 10 | .75 | 10 | .502/.091 | 1.10 |
| B-37 | one night | 6 | 10 | 4 | 5 | 7 | 10 | .75 | 10 | .502/.091 | <1.05 |
| B-35 | none | 6 | 10 | 4 | 5 | 7 | 10 | .50 | 6.6 | .502/.091 | 1.37 |
| B-38 | one night | 6 | 10 | 4 | 5 | 7 | 10 | .50 | 6.6 | .502/.091 | <1.05 |

TABLE 2

Ni—V Preheat Effect

| Disk # | Preheat Amp | Preheat Speed | Temp (°C.) | Ni—V kw | Ni—V Speed | Preheat Amp | Preheat Speed | Cr kw | Cr Speed | Co/Cr kw/kw | Mod. |
|---|---|---|---|---|---|---|---|---|---|---|---|
| B-16 | 6 | 10 | 130 | 4 | 5 | 5 | 10 | .75 | 10 | .502/.091 | 1.18 |
| B-48 | 7 | 10 | 175 | 4 | 5 | 5 | 10 | .75 | 10 | .502/.091 | 1.16 |
| B-50 | 7 | 10 (3 passes) | 247 | 4 | 5 | 5 | 10 | .75 | 10 | .502/.091 | 1.13 |
| B-51 | 7 | 10 (4 passes) | 268 | 4 | 5 | 5 | 10 | .75 | 10 | .502/.091 | <1.05 |

TABLE 3

Ni—V Power Effect

| Disk # | Preheat Amp | Preheat Speed | Ni—V kw | Ni—V Speed | Preheat Amp | Preheat Speed | Cr kw | Cr Speed | Co/Cr kw/kw | Mod. |
|---|---|---|---|---|---|---|---|---|---|---|
| B-10 | 6 | 10 | 8 | 10 | 6 | 10 | .75 | 10 | .470/.052 | 1.22 |
| B-9 | 6 | 10 | 6 | 10 | 6 | 10 | .75 | 10 | .470/.052 | 1.18 |
| B-18 | 6 | 10 | 4 | 10 | 6 | 10 | .75 | 10 | .502/.091 | 1.12 |
| B-14 | 6 | 10 | 3 | 10 | 5 | 10 | .75 | 10 | .502/.091 | 1.10 |
| B-46 | 6 | 10 | 2 | 5 (2 passes) | 5 | 10 | .75 | 10 | .502/.091 | <1.05 |
| B-45 | 6 | 10 | 1 | 5 (4 passes) | 5 | 10 | .75 | 10 | .502/.091 | <1.05 |

TABLE 4

Cr Preheat Effect

| Disk # | Preheat Amp | Preheat Speed | Ni—V kw | Ni—V Speed | Preheat Amp | Preheat Speed | Cr kw | Cr Speed | Co/Cr kw/kw | Mod. |
|---|---|---|---|---|---|---|---|---|---|---|
| B-33 | 6 | 10 | 4 | 5 | 7 | 10 | .75 | 10 | .502/.091 | 1.35 |
| B-16 | 6 | 10 | 4 | 5 | 5 | 10 | .75 | 10 | .502/.091 | 1.18 |
| B-41 | 6 | 10 | 4 | 5 | 4 | 10 | .75 | 10 | .502/.091 | 1.18 |

TABLE 5

Cr Power Effect

| Disk # | Preheat Amp | Preheat Speed | Ni—V kw | Ni—V Speed | Preheat Amp | Preheat Speed | Cr kw | Cr Speed | Co/Cr kw/kw | Mod. |
|---|---|---|---|---|---|---|---|---|---|---|
| B-17 | 6 | 10 | 4 | 5 | 5 | 10 | 1.20 | 10 | .502/.091 | 1.25 |
| B-16 | 6 | 10 | 4 | 5 | 5 | 10 | .75 | 10 | .502/.091 | 1.18 |
| B-36 | 6 | 10 | 4 | 5 | 5 | 10 | .60 | 10 | .502/.091 | 1.12 |

TABLE 6

$H_c$ and $M_r$ Comparison between Ni—V and Ni—P

| Disk # | Undercoat | Preheat Amp | Preheat Speed | Cr kw | Cr Speed | Co/Cr kw/kw | $H_c$ (Oe) | $M_r \times 10^{-3}$ (emu) |
|---|---|---|---|---|---|---|---|---|
| B-1 | Ni—V | 6 | .75 | 10 | | .573/.080 | 551 | 3.10 |
| A-176 | Ni—P | 6 | .75 | 10 | | .573/.080 | 474 | 3.16 |
| B-22 | Ni—V | 6 | .75 | 10 | | .562/.091 | 647 | 2.71 |
| A-204 | Ni—P | 6 | .75 | 10 | | .562/.091 | 570 | 2.95 |
| B-45 | Ni—V | 5 | .75 | 10 | | .562/.091 | 741 | 2.41 |

We claim:

1. A method of fabricating a thin-film disc comprising the steps of:

(a) providing a base having a surface roughness less than about 250 angstroms;
(b) sputtering a substantially non-magnetic nickel-vanadium layer to a thickness of no more than approximately 10 microns; and
(c) depositing at least one magnetic layer to define the recording medium proper of the disc.

2. The invention of claim 1 wherein said sputtering step (b) is carried out to provide a layer having a thickness in the range of 0.3–3 microns.

3. The invention of claim 1 wherein said sputtering step (b) is carried out with a nickel-vanadium target containing about 7% vanadium.

4. The invention of claim 1 wherein said depositing step (c) includes the step of sputtering at least one layer.

5. The invention of claim 1 wherein said depositing step (c) comprises the substeps of:
   (i) sputtering a chromium layer having a thickness of about 500–3000Å; and
   (ii) sputtering a cobalt-chromium layer having a thickness of about 500–2000Å.

6. The invention of claim 1, and further comprising the step, carried out after said depositing step (c), of:
   (d) depositing a wear-resistant overcoat.

7. The invention of claim 1, and further comprising the step, carried out after said providing step (a) and before said sputtering step (b), of:
   (d) heating the base to a temperature in excess of about 200° C.

8. The invention of claim 1, and further comprising the step, carried out after said sputtering step (b) and before said depositing step (c), of:
   (d) oxidizing an outer portion of the non-magnetic layer.

9. A method of fabricating a thin-film disc comprising the steps of:
   (a) providing a base having a surface roughness less than about 250 Å;
   (b) sputtering a substantially non-magnetic nickel-vanadium layer to a thickness of approximately 0.3–3 microns;
   (c) sputtering at least one magnetic layer to define the recording medium proper of the disc; and
   (d) depositing a wear-resistant overcoat.

10. The invention of claim 9 wherein said sputtering step (b) is carried out to provide a layer having a thickness in the range of 0.5–1.5 microns.

11. The invention of claim 9 wherein said sputtering step (b) is carried out with a nickel-vanadium target containing about 7% vanadium.

12. A method of fabricating a thin-film disc comprising the steps of:
   (a) providing a base having a surface roughness less than about 250 angstroms;
   (b) sputtering a substantially non-magnetic nickel-vanadium layer to a thickness of about 0.5–1.5 microns; and
   (c) depositing at least one magnetic layer to define the recording medium proper of the disc;
   said steps (b) and (c) being carried out in an in-line sequence without any intermediate polishing steps.

13. A thin-film disc comprising:
   a base;
   a sputtered undercoat of substantially non-magnetic nickel-vanadium alloy deposited on said base; and
   at least one sputtered magnetic layer overlying said undercoat to define the recording medium proper of the disc.

14. The invention of claim 13 wherein said base is aluminum having a roughness less than about 250 angstroms.

15. The invention of claim 13 wherein said undercoat has a thickness in the range of 0.3–3 microns.

16. A thin-film disc comprising:
   a base having a roughness less than about 250Å;
   a sputtered undercoat of substantially non-magnetic nickel-vanadium alloy of a thickness in the range of 0.3–3 microns deposited on said base;
   at least one sputtered magnetic layer overlying said undercoat to define the recording medium proper of the disc; and
   a wear-resistant overcoat.

17. The invention of claim 16 wherein the undercoat has a thickness in the range of 0.5–1.5 microns.

18. The invention of claim 16 wherein said nickel-vanadium alloy contains about 7% vanadium.

19. A thin-film disc comprising:
   a base having a roughness less than about 250 angstroms;
   a sputtered undercoat of substantially non-magnetic nickel-vanadium alloy having a thickness of approximately 0.5–1.5 microns deposited on said base;
   at least one sputtered magnetic layer overlying said undercoat to define the recording medium proper of the disc; and
   a wear-resistant overcoat.

20. The invention of claim 19 wherein said non-magnetic nickel-vanadium alloy contains about 7% vanadium.

* * * * *